Feb. 28, 1956 R. D. KELL 2,736,762

RECORDING OF COLORED IMAGES

Filed Nov. 12, 1952 3 Sheets-Sheet 1

INVENTOR.
Ray D. Kell
BY [signature]
ATTORNEY

INVENTOR.
Ray D. Kell
BY
ATTORNEY

INVENTOR.
Ray D. Kell

BY [signature]
ATTORNEY

United States Patent Office 2,736,762

Patented Feb. 28, 1956

2,736,762

RECORDING OF COLORED IMAGES

Ray D. Kell, Princeton, N. J., assignor to Radio Corporation of America, a corporation of Delaware Application November 12, 1952, Serial No. 319,926

14 Claims. (Cl. 178—5.4)

This invention relates to methods and apparatus for recording information representing colored images on non-color sensitized recording media such as monochrome film.

Such apparatus may have many uses. For example if color television programs were to be recorded on color film, the cost of the film would be prohibitive. On the other hand if the color information is stored on monochrome film, the cost is drastically reduced.

In accordance with an embodiment of this invention, the recording of the color image information may be effected photographically with a minimum amount of film and utilizing standard projection and scanning mechanisms.

It is evident that a monochrome recording cannot record the colors as such but that it can record signals representative of the colors. Another advantage of the invention realized in the aforesaid embodiment is that the signals selected are such as to place minimum requirements on the scanning linearity required in the recording and playback apparatus. Furthermore, the recording is performed in such a way that the recovery and separation of the various signals from the recording is simplified.

Means in which these features of the invention may be realized will be better understood after a detailed discussion of the drawings in which.

Figure 1:
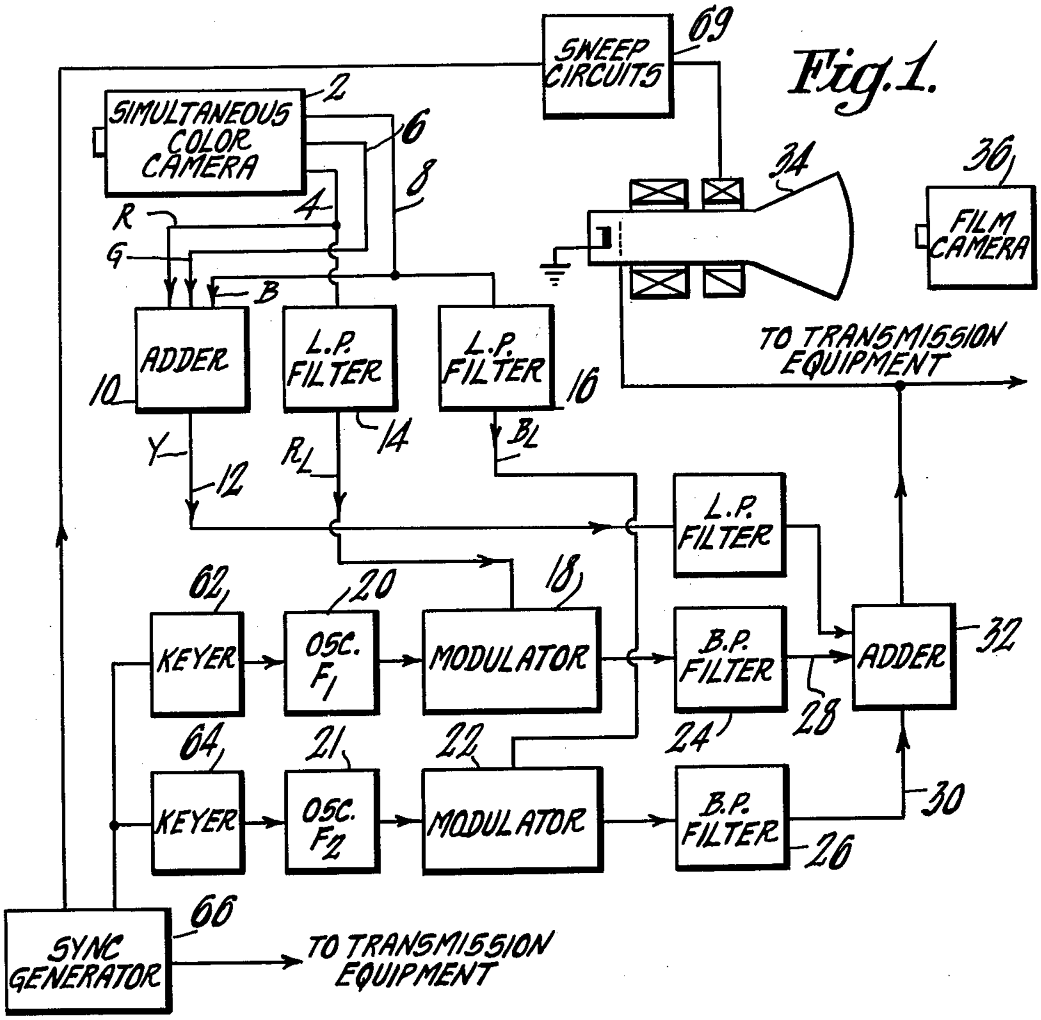
Figure 1 illustrates a form of the invention wherein a photographic recording is made of a brightness signal and two carriers each having a greater frequency than any brightness signal and each being modulated in accordance with a different color.
Figure 3:
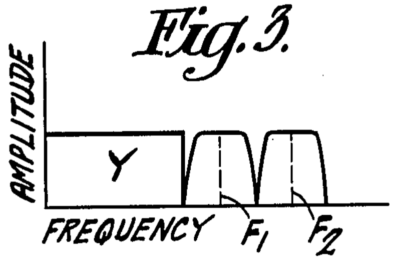
Figure 3 is a graph illustrating the relative frequencies of the two carriers and the brightness signals.

In the embodiment of the invention shown in Figure 1 a video signal representing brightness variations and separate carriers that are amplitude modulated in accordance with the intensity variations of different colors are combined to form a resultant composite signal that is recorded on film. A simultaneous color television camera 2 supplies full band video signals that represent the intensity variations of the red, green and blue light components on leads 4, 6 and 8 respectively. These leads are all connected to an adder 10 that may combine the component color signals in any desirable proportions so as to produce a brightness or Y signal on a lead 12. A low pass filter 14 selects the low frequency portion $R_L$ of the red video signals and a low pass filter 16 selects the low frequency portion $B_L$ of the blue video signals. As a practical example the highest video frequency passed by either of the filters may be 1.5 megacycles. The low frequency red signals $R_L$ are coupled to a modulator 18 in such manner as to control the amplitude of a carrier having a frequency $F_1$ provided by an oscillator 20. The low frequency blue signals $B_L$ are coupled to a modulator 22 in such manner as to control the amplitude of another carrier having a frequency $F_2$ provided by an oscillator 21. The portion of the frequency spectrum occupied by the Y signal appearing at the lead 12 and the products of modulation produced by the modulations may be as indicated in the graph of Figure 3. In this particular example the sidebands of the carrier extend 1.5 megacycles on either side of the carrier frequencies $F_1$ and $F_2$ and the lowest side band frequency is above the highest frequency of the Y signal. Each of the modulators 18 and 22 are singly balanced against the carriers applied to it, in the sense that in the absence of a color signal applied thereto the carrier wave does not appear in the modulator output; i. e. each modulator is effectively cut off when its color signal is at "black" level. Their outputs are respectively coupled to band pass filters 24 and 26 that are adapted to pass only the respective carriers and their sideband frequencies and hence do not pass the signals $R_L$ and $B_L$. However, alternatively, if the modulators 18 and 22 are respectively balanced (in the usual sense) against the signals $R_L$ and $B_L$, the band pass filters may be omitted. In either case the carrier $F_1$ and its sidebands that result from the amplitude modulation of the $F_1$ carrier with the $R_L$ signal appear at a lead 28, and the carrier $F_2$ and its sidebands that result from the amplitude modulation of $F_2$ carrier with the signal $B_L$ appear at a lead 30. An adder 72 is coupled to the leads 12, 28 and 30 so as to combine the signals appearing thereon and form a composite signal. The output of the adder is coupled to an electrode of a kinescope 34 that controls the intensity of the beam therein. A film camera 36 then records an image of the light pattern emitted by the kinescope. The motion of the film in the camera may be continuous or intermittent and the beam in the kinescope may scan in one direction or both depending on the type of film motion selected. However, the particular manner in which the composite signal is impressed on the film does not form a part of the present invention.

Figure 2:
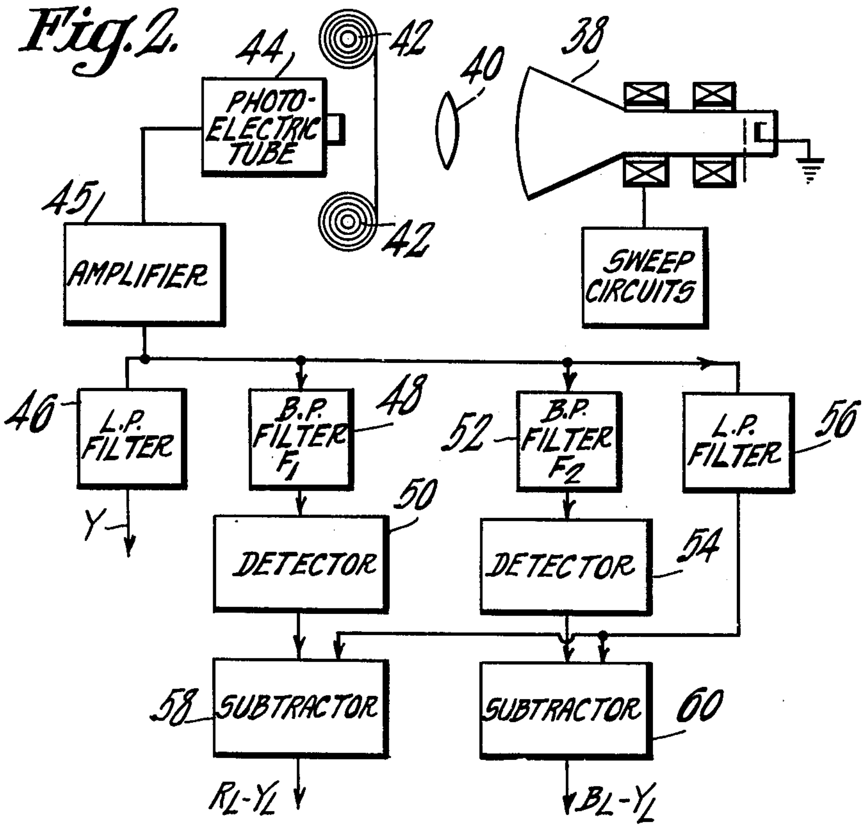
Figure 2 illustrates apparatus for recovering brightness information and various forms of color information from the recording made by the apparatus of Figure 1.

Figure 2 illustrates a mechanism for deriving desired signals representing the colored image from the film recording of the composite signal. Any suitable form of film scanner such as a flying spot scanner may be used. The flying spot scanner is illustrated and may comprise a kinescope 38 having an unmodulated beam, a lens 40, means 42 for intermittently interposing successive frames of the film in the focal plane of the lens 40 and a photoelectric cell 44 to provide an electrical signal corresponding to the intensity variations of the pattern on the film as scanning proceeds. This electrical signal obtained from photoelectric cell 44 comprises components that lie in the three frequency bands of Figure 3. After passing through an amplifier 45 of Figure 2, the signal is applied to a low pass filter 46 that passes the Y components indicated in Figure 3. It will be remembered that these components corresponded directly to the intenssity variations and therefore that they are true video components and as such require no alteration before being applied to a reproducing means. The composite signal recovered by the photoelectric cell 44 is also applied to a band pass filter 48 that selects the sidebands and the carrier $F_1$. An amplitude detector 50 is coupled to the output of the band pass filter 48 so as to recover the signal $R_L$ represented by the side bands. In a similar manner a band pass filter 52, that passes the carrier $F_2$ and, its side-bands and an amplitude detector 54 recover the signal $B_L$. Another low pass filter 56 is provided to pass the lower 1.5 megacycles $Y_L$ of the output of the photoelectric cell.

The signals $R_L$, $B_L$, $Y_L$ and Y thus can be combined in many ways to produce signals required by various types of equipment and the particular manner in which they are combined does not form a part of the present invention. In the arrangement shown in Figure 2 subtractors 58 and 60 subtract the low frequency brightness components $Y_L$ from the low frequency color signals $R_L$ and $B_L$ respectively so as to derive color difference signals $R_L—Y_L$ and $B_L—Y_L$. In a color television system described in the February 1952 issue of "Electronics" color difference signals of this type are used to modulate a color subcarrier. The full band Y signal appearing at the output of the low pass filter 46 can also be used directly in this color television system.

If the recording is to furnish signals for a theatre projector having red, green and blue kinescopes, the low frequency color signals $R_L$ and $B_L$ are both subtracted from the low frequency brightness signal so as to yield the low frequency green signal $G_L$. Each of the three low frequency color signals $R_L$, $B_L$ and $G_L$ may then be applied so as to control the intensity of the cathode ray beams in the kinescopes that emit light of corresponding colors. The high frequencies of the brightness or Y signal may be extracted from the output of the filter 48 and applied to each of the kinescopes so as to produce a brightness pattern representing the detail in the image.

In another arrangement, the Y signal can be applied to a black and white kinescope in a manner described in a U. S. patent application bearing Serial No. 237,362 filed on July 18, 1951, in the name of Schroeder, now U. S. Patent No. 2,646,463, issued July 21, 1953, or as described in a U. S. patent application bearing Serial No. 234,015 filed on June 28, 1951, in the name of Schroeder, now U. S. Patent No. 2,684,995, issued July 27, 1954. The high frequency components $Y_H$ of the Y signal can be selected by either a high pass or band pass filter and applied to all three of the color kinescopes. It will be apparent to those skilled in the art that the signals recovered from the recording could be combined in other ways so as to derive signals that may be required by other types of equipment.

Figure 6:
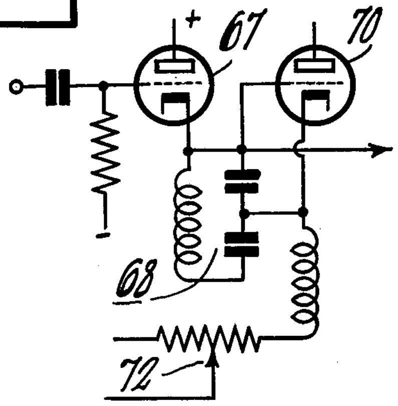
Figure 6 illustrates one possible keyer-oscillator combination that may be used in the arrangements of Figure 1 and 4.

Thus far it has been assumed that the scanning operations are performed in such a way that information representing any point in the image is completely extracted in one scan. However, there are situations where this is not so. For example if the field scanning rate of the kinescope 34 of Figure 1 is 60 fields a second, as is standard in television, and if the recording is to be made on a film in the camera 36 that is to be operated at an average rate of 24 frames a second, the kinescope scans three fields during the time one frame of the film is exposed and two fields when the next frame is exposed etc. This means that one of the fields will be scanned twice on every other frame of the film. Therefore, if the position of the intensity variations representing the products of modulation of the carrier is different on two successive scansions of the odd or even lines of the raster the horizontal resolution will be reduced. Similar effects can be introduced by the film scanning devices required in the arrangement of Figure 2. In order to maintain the positions of the sidebands of the carrier fixed with respect to the line scanning intervals the oscillators 20 and 21 may be keyed into operation by keying circuits 62 and 64 that operate in response to line frequency pulses derived from any standard sync generator 66. Suitable pulses are applied to sweep circuit 69 from the sync generator 66. Thus the oscillations start up at the same time with respect to every line scanning interval. Various types of keying circuits could be used but the one illustrated in Figure 6 has been found satisfactory. Positive line frequency pulses derived in the sync generator 66 are coupled to an amplifier 67 having its cathode connected to one end of a tank circuit 68 that is part of an oscillator 70. During the pulses the amplifier 67 conducts heavily and loads down the tank circuit to such an extent that the oscillator ceases to operate. At the trailing edge of the line frequency pulse, the conduction in the amplifier 67 is sharply reduced so that it no longer provides any substantial load and oscillations are resumed. In this way the oscillations have the same position in time with respect to the line frequency pulses and hence have the same position with respect to the line scanning interval following the sync pulses. A variable resistor 72 is connected in series with the oscillator as shown so as to control the rate at which the oscillations reach their peak amplitude.

Figure 5:
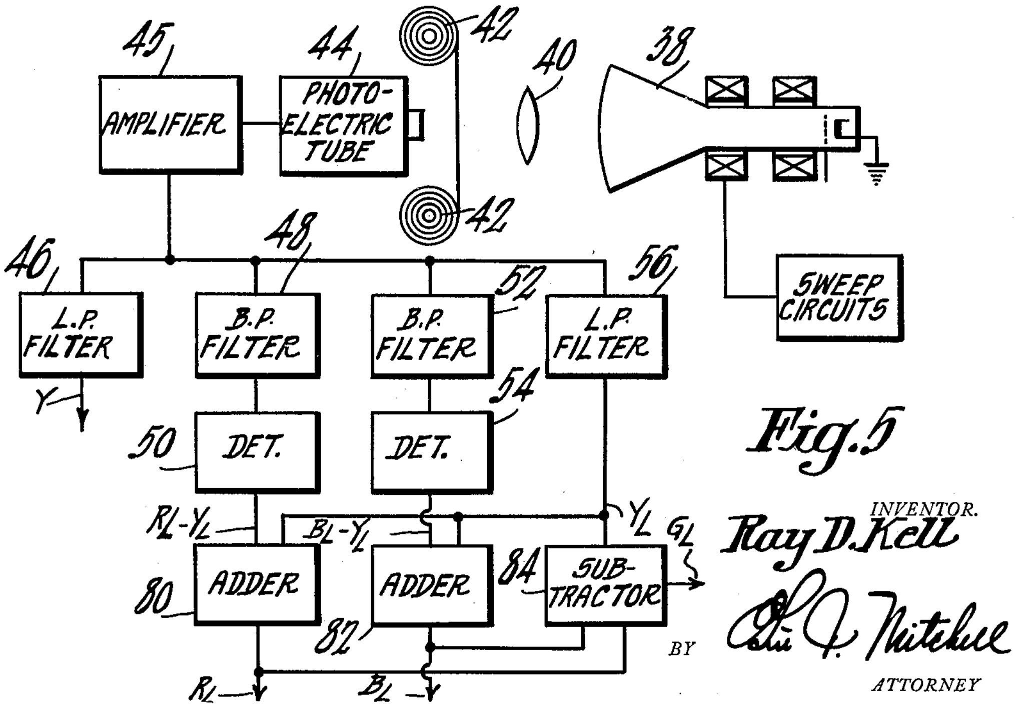
Figure 5 illustrates apparatus for recovering brightness and color information from the photographic recording made by the apparatus of Figure 4.
Figure 4:
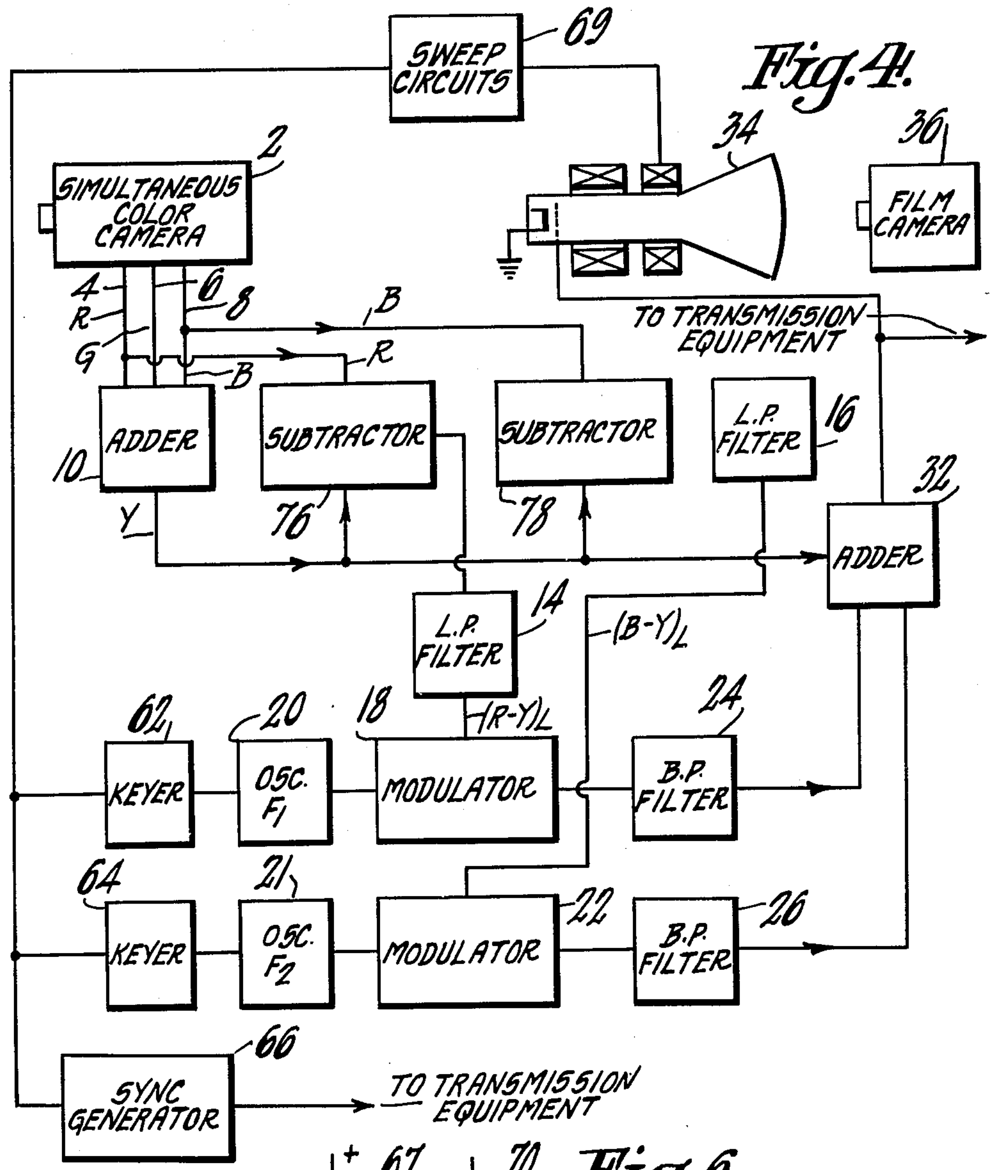
Figure 4 illustrates an embodiment of the invention whereby a photographic recording is made of a brightness signal and two separate carriers each of which is modulated in accordance with a different color difference signal.

In the particular embodiment of the invention shown in Figure 1 the color signals employed to modulate the carrier represented different colors but as will become apparent from the consideration of Figures 4 and 5 the color signals can represent other types of color information instead of pure colors. For example, they could be color difference signals representing the difference between two colors or as in the case of Figures 4 and 5 the color signals can be color difference signals representing the difference between a single color and the brightness signal. Therefore, color signals as used in the specification refers to any band of suitable color information.

Figure 4 illustrates another arrangement for recording signals representing colored images on film. Corresponding components of Figure 4 and Figure 1 are designated by similar numerals and will not be discussed again. The main difference in the apparatus of Figure 4 is that the color signals that are applied to the modulators are color difference signals $(R—Y)_L$ and $(B—Y)_L$ instead of the signals $R_L$ and $B_L$. Full band color difference signals R—Y and B—Y are derived by subtractors 76 and 78 and the low frequency color difference signals are extracted by the low pass filters 14 and 16 respectively.

The apparatus of Figure 5 is adapted to recover the color difference signals $R_L—Y_L$ and $B_L—Y_L$ that are represented by the carrier and its sidebands which are recorded in the film by the apparatus of Figure 4. Those components of Figure 5 that have counterparts in Figure 2 are designated by the same numerals and will not be further discussed as it is apparent that the detectors 50 and 54 recover whatever signal is represented by the sidebands of the two carriers. If it is desired to derive the low frequency signals $R_L$ and $B_L$, the signal $Y_L$ appearing at the output of the low pass filter 56 is added to the color difference signals $R_L—Y_L$ and $B_L—Y_L$ by adders 80 and 82. The low frequency green signal $G_L$ is derived by subtracting the signals $R_L$ and $B_L$ from the signal $Y_L$ in a subtractor 84.

What is claimed is:

1. Apparatus for recording signals representing colored images on monochrome film comprising in combination a source of signals corresponding to brightness variations as a scene is scanned, a source of a first carrier wave having a frequency that is substantially greater than the highest frequency in the brightness signal, a source of a second carrier wave having a frequency that is higher than the first, a source of a first color signal, a source of a second color signal, a first amplitude modulator coupled to the source of the first carrier and the source of the first color signal in such manner that the first carrier is amplitude modulated in accordance with the first color signal, a second amplitude modulator coupled to the source of the second carrier and the source of the second color signal in such manner that the second carrier is amplitude modulated in accordance with the second color signal, means for combining the brightness signal and the products of modulation produced by said modulators so as to form a composite signal, means for emitting light in accordance with the composite signal, and means for recording the light variations on film.

2. Apparatus as set forth in claim 1 wherein the color signals represent single colors.

3. Apparatus as set forth in claim 1 wherein the color signals are color difference signals.

4. Apparatus for recovering signals representing a colored image from a film having recorded thereon a composite signal comprised of a brightness signal, a first carrier that is amplitude modulated in accordance with a first color signal and a second carrier that is amplitude modulated in accordance with a second color signal, the frequencies of the carriers being different and higher than the highest brightness signal frequencies, said apparatus comprising in combination a film scanner adapted to derive the composite signal from said film, a low pass filter coupled to the output of said film scanner so as to receive said composite signal and extract from it the brightness signal, a first band pass filter adapted to pass a band of frequencies surrounding the first carrier frequency, said first filter being coupled so as to receive the composite signal appearing at the output of the film scanner, and a first amplitude detector coupled to the output of the first band pass filter so as to derive the first color signal, a second band pass filter coupled to the output of said film scanner and adapted to pass a band of frequencies surrounding the second carrier and a second amplitude detector coupled to the output of said second band pass filter so as to derive the second color signal.

5. In a color image signal translating system employing signals representative of the brightness of an image and signals respectively representative of at least two different color aspects of said images, the combination comprising means for limiting said brightness signal to a first predetermined band of frequencies, means for shifting in frequency at least a portion of one of said color representative signals to occupy a predetermined band of frequencies differing from said first predetermined band, and means for simultaneously recording said frequency limited brightness signal and said frequency shifted color representative signal portion as a composite signal.

6. A combination in accordance with claim 5 wherein said color representative signals are respective component color signals.

7. A combination in accordance with claim 5 wherein said color representative signals are respective color difference signals.

8. In a color image signal translating system employing signals representative of the brightness of an image and signals respectively representative of at least two different color aspects of said images, the combination comprising means for limiting said brightness signal of a first predetermined band of frequencies, means for shifting in frequency at least a portion of all but one of said color representative signals to occupy respective predetermined bands of frequencies differing from said first predetermined band, and means for simultaneously recording said frequency limited brightness signal and said frequency shifted color representative signal portions as a composite signal.

9. A color image recording system comprising the combination of means for deriving a plurality of different component color signals representative of respectively different color aspects of an image, means for combining all of said component color signals to provide a signal representative of the brightness of said image, a first source of carrier frequency waves of a first frequency, a second source of carrier frequency waves of a second frequency, means for modulating the carrier frequency waves from said first source in accordance with one of said component color signals, means for modulating the carrier frequency waves from said second source in accordance with another of said component color signals, means for combining said brightness signal with the modulated carriers developed by said pair of modulating means to produce a composite signal, and means for recording said composite signal.

10. A color image recording system in accordance with claim 9 wherein said recording means includes means for converting said composite signal into a visual display, and means for photographing said visual display.

11. Apparatus for recovering signals representative of a color image from a recording of a composite signal comprising a signal representative of the brightness of the image and limited in frequency to a first predetermined band of frequencies, a first color signal comprising at least a portion of a signal representative of a first color aspect of said image shifted in frequency to occupy a second predetermined band of frequencies differing from said first predetermined band, and a second color signal comprising at least a portion of a signal representative of a second color aspect of said image shifted in frequency to occupy a third predetermined band of frequencies differing from said first and second predetermined bands, apparatus comprising the combination of means for deriving said composite signal from said recording, filter means coupled to said composite signal deriving means and having a passband substantially corresponding to said first predetermined band so as to extract said brightness signal from said composite signal, additional filter means coupled to said composite signal deriving means and having a passband corresponding to said second predetermined band so as to extract said first frequency shifted color signal from said composite signal, means coupled to said additional filter means for deriving said first color aspect representative signal portion from said first frequency shifted signal, further filter means coupled to said composite signal deriving means and having a passband corresponding to said third predetermined band so as to extract said second frequency shifted color signal from said composite signal, means coupled to said further filter means for deriving said second color aspect representative signal portion from said second frequency shifted signal, and color image signal utilization means for utilizing said extracted brightness signal and said derived color aspect representative signal portions.

12. Apparatus in accordance with claim 11 wherein said signal utilization means includes means for combining said brightness signal with one of said color representative signals.

13. Apparatus in accordance with claim 12 wherein said color representative signals comprise respective component color signals and wherein the output of said signal combining means is a color difference signal.

14. Apparatus in accordance with claim 12 wherein said color representative signals comprise respective color difference signals and wherein the output of said signal combining means is a component color signal.

References Cited in the file of this patent

UNITED STATES PATENTS

| | | |
|---|---|---|
| 2,607,845 | Clark | Aug. 19, 1952 |
| 2,615,975 | Sziklai | Oct. 28, 1952 |
| 2,635,140 | Dome | Apr. 14, 1953 |
| 2,646,463 | Schroeder | July 21, 1953 |

OTHER REFERENCES

"Principles of NTSC Compatible Color Television," Electronics, February 1952.